United States Patent
Lee et al.

(10) Patent No.: US 6,797,372 B2
(45) Date of Patent: Sep. 28, 2004

(54) RESIN-COATED STEEL FOR FUEL TANKS OF AUTOMOBILE AND METHOD FOR MANUFACTURING THE SAME

(75) Inventors: Jae-Ryung Lee, Pohang (KR); Sam-Kyu Chang, Pohang (KR); Sang-Geol Noh, Pohang (KR); Soo-Hyoun Cho, Pohang (KR)

(73) Assignee: Pohang Iron & Steel Co., Ltd., Pohang (KR)

( * ) Notice: Subject to any disclaimer, the term of this patent is extended or adjusted under 35 U.S.C. 154(b) by 0 days.

(21) Appl. No.: 09/914,440

(22) PCT Filed: Dec. 26, 2000

(86) PCT No.: PCT/KR00/01532
§ 371 (c)(1),
(2), (4) Date: Aug. 27, 2001

(87) PCT Pub. No.: WO01/48265
PCT Pub. Date: Jul. 5, 2001

(65) Prior Publication Data
US 2003/0021984 A1 Jan. 30, 2003

(30) Foreign Application Priority Data
Dec. 28, 1999 (KR) ......................................... 1999-63948

(51) Int. Cl.$^7$ .............................. B32B 5/16; B32B 5/30; B32B 11/02; C08K 3/22; B05D 3/02
(52) U.S. Cl. ........................ 428/323; 428/327; 428/328; 428/336; 428/402; 427/239; 524/430; 524/431; 524/432; 524/433; 524/434; 524/435; 524/437; 524/492; 524/493
(58) Field of Search ................................. 428/323, 328, 428/332, 336, 339, 402, 413, 546, 623, 626, 659, 681, 697, 327, 632; 524/430–435, 437, 492–493; 427/239

(56) References Cited

U.S. PATENT DOCUMENTS

| | | | |
|---|---|---|---|
| 5,330,850 A | * 7/1994 | Suzuki et al. | 428/623 |
| 5,612,394 A | * 3/1997 | Pfeil et al. | 523/403 |
| 5,753,740 A | * 5/1998 | Odawa et al. | 524/414 |
| 6,235,407 B1 | * 5/2001 | Ogata et al. | 428/626 |
| 6,387,538 B1 | * 5/2002 | Lee et al. | 428/632 |

FOREIGN PATENT DOCUMENTS

| | | |
|---|---|---|
| DE | 44 41 883 | 5/1996 |
| JP | 3-074481 | 3/1991 |
| JP | 5-255587 | 10/1993 |
| JP | 8-53646 | 2/1996 |

OTHER PUBLICATIONS

Eastech Chemical, Inc., "PAPHEN(r) Phenoxy Resins", available at http://www.eastechchemical.com/prdc/func/docs/01–Phenoxy_Product_Guide.pdf (last accessed May 19, 2003).
*English abstract is attached.

* cited by examiner

Primary Examiner—Paul Thibodeau
Assistant Examiner—Nikolas J. Uhlir
(74) Attorney, Agent, or Firm—Baker Botts LLP

(57) ABSTRACT

The present invention relates to a resin-coated steel sheet for fuel tanks of an automobile and a resin solution used for the same. The resin solution of the present invention comprises (a) a main solution of water soluble phenoxy resin having a number average molecular weight of 25,000 to 50,000; (b) 2 to 15 phr of melamine resin on the basis of the main solution; (c) 10 to 20 phr of colloidal silica on the basis of the main solution, (d) 2 to 10 phr of teflon resin on the basis of the main solution, and (e) 5 to 70 phr of metallic powder being selected at least one material from the group consisting of Al, Zn, Mn, Co, Ni, Sn and SnO. The resin solution is coated on a cold rolled steel sheet plated with zinc or zinc alloy over which a chromate layer films, and then baked at a local temperature of 160 to 250° C. to prepare a resin-coated steel sheet for fuel tanks of an automobile.

7 Claims, 1 Drawing Sheet

RESIN-COATED STEEL FOR FUEL TANKS OF AUTOMOBILE AND METHOD FOR MANUFACTURING THE SAME

BACKGROUND OF THE INVENTION (a) Field of the Invention

The present invention relates to an unleaded surface-treated steel sheet for fuel tanks of an automobile, more specifically, a resin-coated steel sheet coated with resin film on the surface of unleaded surface-treated steel sheet coated with chromate layer and a method of fabricating the same (b) Description of the Related Art Generally, it is required that fuel tanks for storing fuel of an automobile should have resistance to corrosion on its outer surface to be exposed to the atmosphere (hereinafter, referred to as the "cosmetic corrosion resistance") as well as resistance to corrosion on its inner surface to contact fuel such as gasoline (hereinafter, referred to as the "fuel corrosion resistance").

In addition, since two parts are joined each other in a fuel tank by seam welding or joining method such as brazing, good weldability and good processibility are required for the steel sheet to be applied for use in forming fuel tanks.

A ternesheet that is a cold-rolled steel sheet plated with lead-tin (Pb—Sn) alloy has widely used as such a steel sheet for fuel tanks. However, the ternesheet has been limited in its use because it contains lead (Pb) that causes environmental pollution.

In this connection, extensive researches have been made to develop a surface-treated steel sheet for fuel tanks without any lead content.

Japanese patent laid-open No.63-69631 and Japanese patent publication No.2-18982 described an electric zinc plated steel sheet as an unleaded steel sheet. The unleaded steel sheets described in the above patent were prepared by coating zinc or zinc-based alloy such as Zn—Ni, Zn—Co, Zn—Fe, Zn—Al on the surface of steel sheet in the amount of 1–200 g/m$^2$ and coating organic resin film comprising phenoxy resin and rubber-modified epoxy on the upper side of zinc plated layer in the thickness of 2–50 μm.

The above surface-treated steel sheet, however, has a problem such as exfoliation of plated layer while processing because the plated layer is thick. In addition, since an organic coating layer coated on the uppermost layer is also thick, it is difficult to weld. Furthermore, adhesion between zinc alloy plated layer and organic resin coated layer becomes lower so that there is a problem of exfoliation between the two layers.

In order to solve the above problems, the present inventors invented an International patent publication No. WO 00/32843. The above patent provides an unleaded plated steel sheet coated with resin coating comprising metal powder on chromate layer that is in turn coated on zinc or zinc-based alloy plated steel sheet.

The above invention, however, has a problem that since processed side does not resist against the pressure of mold die while processing due to metal powder comprised in resin coating, it may exfoliate a part of resin layer In the coated resin coating, the above problem results from lower slip characteristic of resin layer. The slip characteristic of resin layer has a close relation with wax added to resin solution, and a type, composition and particle size of metallic powder.

Therefore, an unleaded steel sheet that can prevent exfoliation of coating by improving slip characteristic as well as maintaining cosmetic corrosion resistance and fuel corrosion resistance is required.

SUMMARY OF THE INVENTION

Therefore, the present invention is derived to solve the above problems. The present invention provides an improved resin solution used for preparing resin-coated steel sheet without damaging chemical characteristics of resin.

It is another object of the present invention to provide a method of fabricating resin-coated steel sheet for fuel tanks of an automobile which has improved cosmetic corrosion resistance and fuel corrosion resistance as well as processibility by coating the resin solution.

In order to achieve the above objects, the resin solution of the present invention is prepared by mixing a main solution selected from epoxy resin, urethane resin, and phenoxy resin melaniine resin, colloidal silica, polytetrafluoroethylene ("PTFE")-based wax, and at least one metallic powder selected from Al, Zn, Mn, Co, Ni, Sn, and SnO.;

The main solution used in the resin solution of the present invention is a water-soluble phenoxy resin with a number average molecular weight of 25,000–50,000. Melamine resin is added as a hardener and the amount is 2–15 phr on the basis of the main solution. Also, an amount of colloidal silica is 10–20 phr on the basis of the main solution, an amount of PTFE wax is 2–10 phr on the basis of the main solution, and an amount of metallic powder is 5–70 phr on the basis of the main solution.

The PTFE-based wax added to the resin solution of the present invention is preferably a powder type and particle size of 0.1–3 μm. In addition, particle size of the metallic powder is 0.5–5 μm.

The present invention provides a method of fabricating surface-treated steel sheet by using the resin solution.

The surface-treated steel sheet of the present invention comprises coating chromate film on a cold-rolled steel sheet plated with zinc or zinc alloy and then it is coated with resin solution of the present invention. After coating the resin solution, it is baking dried at 140–250° C. based on metal temperature. In this case, the coating thickness of resin solution is preferably 1–10 μm based on coating thickness after drying.

The surface-treated steel sheet of the present invention can maintain slip characteristic of the resin coating as well as prevent exfoliation of coating resulted from metallic powder.

Therefore, if the surface-treated steel sheet of the present invention is used to manufacture a fuel tank, a press processibility of the steel sheet is remarkably improved.

DETAILED DESCRIPTION OF THE PREFERRED EMBODIMENTS

Preferred embodiments of this invention will be explained with reference to the accompanying drawing.

Figure 1:
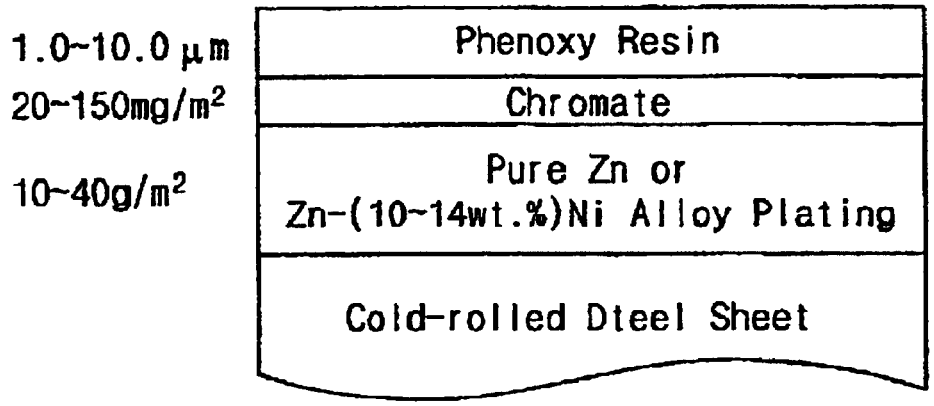
FIG. 1 is a cross-sectional view of a resin-coated steel sheet for fuel tank wherein one side is coated with the resin.

As shown in FIG. 1, the resin-coated steel sheet according to the present invention has a structure that zinc or zinc-nickel alloy is plated on a cold-rolled steel sheet and chromate is coated on the plated steel sheet, and resin solution of the present invention is coated in the thickness of 1–10 μm.

Low-carbon steel sheet having less than or 0.03% of carbon content is preferably used as the cold-rolled steel sheet in the present invention.

Zinc (Zn), zinc—nickel (Zn—Ni) alloy, zinc—cobalt (Zn—Co) alloy, zinc—manganese (Zn—Mn) alloy or zinc—chrome (Zn—Cr) alloy may be used as the plating material. In the present invention, zinc—nickel (Zn—Ni) alloy steel sheet is preferably used because it has better cosmetic corrosion resistance than that of zinc-plated steel sheet.

Chromate solution applied to zinc-nickel plated steel sheet includes a reactive type, electrolyte type, and coating type, in which coating type is preferable in terms of cosmetic corrosion resistance. When the chromate solution is applied to the steel sheet, it can be plated on one side or both sides. It is preferable to coat on both sides.

Figure 2:
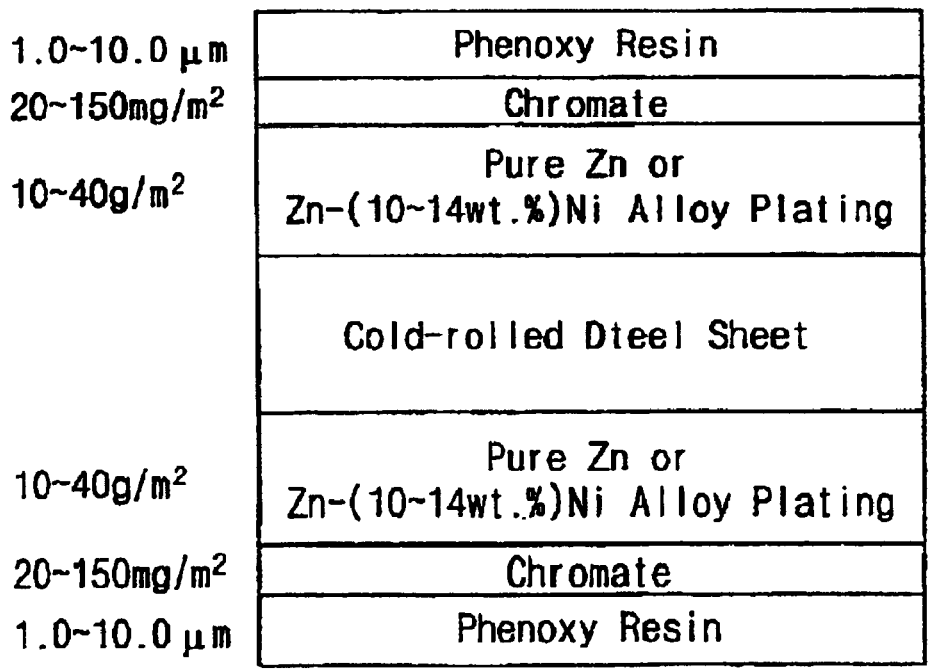
FIG. 2 is a cross-sectional view of a resin-coated steel sheet for fuel tank wherein both sides are coated with the resin.

However, in case of resin solution, it can be alternatively coated on one side(FIG. 1) or both sides(FIG. 2) depending on the needs of a secondary processor.

Such an alternation depends on the welding condition when the resin-coated steel sheet is used for manufacturing fuel tanks. That is, in case of high current condition that is easy for welding and frequent replacing of electrolyte, it is preferable to use steel sheet coated on both sides whereas in case of low current condition and infrequent replacing of electrolyte, it is preferable to use steel sheet coated on one side.

When manufacturing a fuel tank by a steel sheet coated with resin on one side, it is preferable to weld the tank by placing the coated side to face fuel side and chromate-coated side which is not coated with resin to face outer side. Thus, it makes welding easily because the welding electrolyte does not contact with resin part. In addition, if necessary, paint is applied to a side which is not coated with resin in the thickness of about 100 micrometer so to reinforce corrosion resistance of fuel lank, thus, it has little influence to corrosion resistance.

Hereinafter, the resin solution used in the resin-coated steel sheet of the present invention will be explained in detail.

The resin solution of the present invention comprises a main resin solution, a hardener, colloidal silica, metallic powder, and a lubricant.

The main solution of the resin solution is acryl resin, epoxy resin, or urethan resin, preferably phenoxy resin.

Phenoxy resin has excellent cosmetic corrosion resistance and fuel corrosion resistance because it has higher glass transition temperature(100° C., Tg) than other resins.

Thus, even if the surrounding temperature of a fuel tank is more than 100° C., the chains of phenoxy resin do not show microbrown movement and do not modify. Due to these characteristics of phenoxy resin, it prevents water or gasoline from penetrating so that cosmetic corrosion resistance of steel sheet is reinforced.

It is preferable to use phenoxy resin having a number average molecular weight of 25,000 to 50,000. When the number average molecular weight is below 25,000, it is difficult to have desired cosmetic corrosion resistance. When the number average molecular weight is more than 50,000, it is impossible to synthesize the resin.

When epoxy resin is a main solution, however, it is preferable to have a number average molecular weight of 4,000 to 6,000 and when urethan resin is a main solution, it is preferable to have a number average molecular weight of about 15,000.

Melamine resin as a hardener can be added to phenoxy resin solution of the present invention. Melamine resin has a role to react with hydroxy group of phenoxy resin while forming coating layer so that it makes a closer resin coating. That is, linear structure of phenoxy resin converts to network structure by adding melamine resin. Thus, this resin structure can prevent outer corrosion element from penetrating so that it can improve cosmetic corrosion resistance.

The content of melamine resin is preferably 2–15 phr (parts per hundred resin: an amount per 100 weight part of main solution) based on phenoxy resin. If content of melamine is less than 2 phr, hardening reaction is not sufficient. On the contrary, if content of melamine is more than 15 phr, reactions between hardeners themselves occur so that it forms cracks in the coating layer.

Colloidal silica is added to improve cosmetic corrosion resistance of resin coating. Since soluble phenoxy resin is basic, colloidal silica which is also basic is selected from other silica.

The content of colloidal silica is preferably 10–20 phr based on phenoxy resin content. If content of colloidal silica is less than 10 phr, it is too small to have cosmetic corrosion resistance effect. On the contrary, if content of colloidal silica is more than 20 phr, there is no improved effect of cosmetic corrosion resistance relative to the added content of colloidal silica.

Metallic powder added into the resin solution of the present invention has a role to enhance electrically conductive property of resin coating.

Since resin coating itself serves as a nonconductor while resistance welding between sheet and sheet, sparks can occur during welding or resin coating of welded part can be exfoliated easily. Therefore, it needs to penetrate metallic powder into the inner side of resin coating in order that it can use both screening effect of resin and electric conductivity of metallic powder. Thus, the resin coating can maintain both screening effect and electric conductivity. Accordingly, the resin solution satisfies weldability and cosmetic corrosion resistance of the steel sheet simultaneously. Metallic powder is preferably selected from metals having conductivity as well as cosmetic corrosion resistance and fuel corrosion resistance.

Examples of metallic powder are Al, Zn, Mn, Co, Ni, Sn, and SnO. These metals can be used alone or combination of at least one.

A particle size and a type of the metallic powder added into resin solution have important effect.

A particle size of the metallic powder is preferably 0.5–5 μm. If the particle size is less than 0.5 μm, dispersion decreases in the resin solution, secondary agglomeration occurs and cost increases. On the contrary, if the particle size is more than 5 μm, the particle is too heavy so that it sinks in the resin solution, which results sludge. In addition, the sludge protrudes into the surface of resin coating so that it deteriorates the processibility of steel sheet.

A particle type of metallic powder is preferable to have a plate-type rather than a sphere-type in terms of conductivity of resin coating and stability of solution because sphere-type more easily precipitates in the resin solution than plate-type. In addition, in terms of conductivity, since a plate-type has more chances to overlap, it has a role as a path of electrical conductivity. The thickness of plate-type particle is preferably 0.1–0.5 μm.

The content of metallic powder is preferably 5–70 phr based on phenoxy resin content. If content of metallic powder is less than 5 phr, it cannot contribute to weldability. On the contrary, if content of meetallic powder is more than 70 phr, storability of resin coating solution decreases and coating adhesion with chromate layer decreases.

Wax added into resin solution serves as a lubricant to metallic powder. The wax that is preferable to use PTFE.

Comparing the prior ethylene-based wax, PTFE-based wax has an excellent slip characteristic of resin coating. In addition, PTFE-based wax can cover the metallic powder protruded onto resin coating so that it can prevent friction between dye and resin coating while press processing.

The content of PTFE-based wax is preferably 2–10 phi based on phenoxy resin content. If content of PTFE wax is less than 2 phi, it is too small to improve surface friction coefficient. On the contrary, if content of PTFE wax is more than 10 phi, coating adhesion with paint which can be applied into upper resin layer decreases.

A particle size of PTFE wax added into resin solution has important effect. A particle size of PTFE wax is preferably 0.1–3 $\mu$m. If the wax size is less than 0.1 $\mu$m, the ball-bearing effect based on wax theory decreases in the resin solution. On the contrary, if the wax size is more than 3 $\mu$m, the stability of the resin solution decreases and it prevents metallic powder from forming current structure so that conductivity decreases.

Hereinafter, a method of fabricating resin-coated steel sheet using resin is solution of the present invention is explained.

At first, zinc-nickel plating that is plated on the surface of cold-rolled steel sheet is explained.

Although there are many kinds of plating methods as zinc-nickel plating method, electric plating method is used in the present invention because it is easy to control an amount of plating and it has good surface property after plating.

When plating with zinc-nickel alloy, the content of nickel is 10–14 wt % because alloy having the above composition is excellent in terms of processibility and cosmetic corrosion resistance.

The amount of plating of zinc-nickel alloy that is plated on cold-rolled steel sheet is preferably 10–40 g/m$^2$. If the amount of plating is less than 10 g/m$^2$, the cosmetic corrosion resistance is not sufficient. On the contrary, if the amount of plating is more than 40 g/m$^2$, the thickness of plating is too thick so that alloy-plated layer is exfoliated and powdering occurs while press processing. In addition, as the plating amount increases, power used for welding increases.

After plating zinc-nickel alloy, chromate layer is coated.

Chromate layer is coated in order to increase adhesion between resin-coated layer and zinc-nickel plated layer.

Chromate solution used for chromate coating comprises a) a main solution prepared by adding 20 to 150 w % of phosphoric acid, 10 to 100 w % of fluoric acid, 50 to 2000 w % of colloidal silica of which ph is 2–5, and 5 to 30 w% of sulfuric acid on the basis of chrome in a chrome solution having 0.4 to 0.8 of trivalent chrome rate; b) a hardener aqueous solution comprising epoxy silane of 2 to 10 w % on the basis of total hardener solution, the pH of which being controlled between 2 and 3, said hardener aqueous solution of 5 to 50 w % being added to the main solution.

Coating process of chromate layer includes roll coating, spray, impregnation and so on. It is preferably to use roll coating process in the present invention.

The coating process comprises dipping chromate solution in a drip pan into pick-up-roll(P.U.R), transferring it by a transfer-roll(T.F.R), dipping it into steel sheet in the applicator-roll(A.p.R), and drying. The amount of chromate solution attached to the steel sheet is regulated by each roll driving direction, rolling speed, and each roll adhesion pressure. The above roll coating process can be applicable to one side or both sides of steel sheet.

A steel sheet coated with chromate solution is baking dried at a drying furnace. Baking temperature of the steel sheet coated with chromate is preferably 140–250° C. based on the metal temperature. If baking temperature is less than 140° C., hardening reaction of chromate solution is not sufficient. On the contrary, if the baking temperature is more than 250° C., minute cracks occur on the chromate coating layer so that cosmetic corrosion resistance decreases.

The amount of chromate is preferably 20–150 mg/m$^2$ on the basis of chrome amount after drying. If the content is less than 20 mg/m$^2$, cosmetic corrosion resistance is not sufficient so that it is not appropriate to use as a fuel tank. On the contrary, If the content is more than 150 mg/m$^2$, chrome elutes from chromate coating layer and the cost increases so that it is not economical.

As above, after coating chromate layer, the resin solution of the present invention is coated on the steel sheet.

The composition of resin solution is the same as the above and coating process is the same as that of the chromate solution.

After coating, baking temperature of the steel sheet coated with resin solution is preferably 140–250° C. based on the metal temperature. If baking temperature is less than 140° C., hardening reaction of resin solution is not sufficient so that cosmetic corrosion resistance and fuel corrosion resistance decrease. On the contrary, if the baking temperature is more than 250° C., hardening reaction does not occur any longer and loss of calories increases.

Thickness of the resin coating which is coated on upper side of chromate layer is preferably 1.0–10.0 $\mu$m. If the thickness is less than 1.0 $\mu$m, the thickness of the coating is too thin to have sufficient cosmetic corrosion resistance and fuel corrosion resistance. On the contrary, if the thickness is more than 10.0 $\mu$m, there is no influence to cosmetic corrosion resistance and fuel corrosion resistance according to increase of the thickness as well as weldability lowers when steel sheet is welded each other.

Now, preferred embodiments are suggested to help the apparent understanding of the present invention. The below embodiments are provided for the sake of clear understanding only and the present invention is not limited thereto.

EXAMPLE

After plating zinc-nickel alloy on cold-rolled steel sheet in the amount of 30 g/m$^2$, chromate was coated on there. Chromate coating layer was coated in the amount of 50 mg/m$^2$ based on the chrome amount after drying and baking dried at 160° C.

In this case, chromate solution has 0.5 of trivalent chrome ratio(chrome reduction ratio) and 29 g/l of chrome concentration. It comprises a main solution comprising 100 wt % of colloidal silica, 30 wt % of fluoric acid, 50 wt % of phosphoric acid, and 10 wt % of sulfuric acid based on chrome and 30 wt % of hardener solution comprising 10 wt % of epoxy silane.

Resin solution dispersed in water was coated on the steel sheet as a phenoxy resin. The composition of resin solution includes 100 g of phenoxy resin with number average molecular weight of 50,000(Union carbide, PKHW-35), 5 phr of melamine resin as a hardener(Cytec company, Cymel 325), 15 phr of colloidal silica with particle size of 20 nm(Ilsan Chemical Company, Snowtex-N) and 15 phr of metallic powder with particle size of 2 μm. In addition, according to the composition of below table 1, wax was added into the above resin solution. The wax was a tefron-based wax made in Korea, Okitusmo company(NLF25W). To compare the material properties of the resin coated steel sheet of the present invention, ethylene-based wax(Korea, PS35) was used instead of tefron-based wax.

The above resin solution was coated on steel sheet and baking dried at 190° C. As a result, resin-coated steel sheet with dried coating thickness of 3 μm was manufactured.

A friction coefficient of steel sheet, an exfoliation of resin coating layer, stability of resin solution, and coating adhesion of top coater were measured and the results were shown in the table 1.

The friction coefficient, the exfoliation of resin coating layer, stability of resin solution, and coating adhesion of top coater were evaluated by following method.

1) Friction Coefficient

The prepared resin-coated steel sheet was cut into 45×300 mm and the burrs of the corners were removed. The friction coefficient was measured under 0.27 kg/cm² of pressure and 1.000 mm/min of drawing speed in the one-side friction tester. The results are as follows.

⊚: friction coefficient; less than 0.15
0: friction coefficient; 0.15–0.2
□: friction coefficient; 0.2–0.25
Δ: friction coefficient; 0.25–0.3
X: friction coefficient; more than 0.3

2) Exfoliation of Coating layer

After measuring friction coefficient, the extent of scratch and exfoliation were measured by scratching the specimens. The results are as follows.

⊚: The exfoliated and scratched area is 0%.
0: The exfoliated and scratched area is 0–5%.
□: The exfoliated and scratched area is 5–10%.
Δ: The exfoliated and scratched area is 10–20%.
X: The exfoliated and scratched area is more than 20%.

3) Stability of Resin Solution

Stability of resin solution was measured by time taken to form sludge in the resin solution without any oscillation at normal temperature. The results are as follows.

⊚: The time taken to form sludge is more than 5 days.
0: The time taken to form sludge is 1–5 days.
□: The time taken to form sludge is 12–24 hours.
Δ: The time taken to form sludge is 2–12 hours.
X: The time taken to form sludge is less than 2 hours.

4) Coating Adhesion of Top Coater

Coating adhesion between resin coating layer and top coater was measured by coating melamine-alkyd resin on the top of resin coating with a bar coater and drying for 5 min at normal temperature. And then, the steel sheet coated with melamine-alkyd resin was baking dried at 150° C. for 20 min. The thickness of dried coating was 20 μm.

After coating the top coater, cross stripes were made by the specimens with 1 mm spaces. After attaching cellophane tape into the coating and adding determined pressure, the tape was peeled off. The coating area exfoliated was measured. The results are as follows.

⊚: The area of top coater exfoliated is 0%.
0: The area of top coater exfoliated is 0–5%.
□: The area of top coater exfoliated is 5–10%.
Δ: The area of top coater exfoliated is 10–20%.
X: The area of top coater exfoliated is more than 20%.

TABLE 1

| | wax | | | Quality measurement | | | |
|---|---|---|---|---|---|---|---|
| No. | Type | Particle size(μm) | Amount (phr) | Friction coefficient | Coating exfoliation | Solution stability | Adhesion |
| Com. 1 | — | — | 0 | X | Δ | ⊚ | ⊚ |
| Com. 2 | PTFE | 0.1 | 1 | □ | □ | ⊚ | ⊚ |
| Ex. A | | | 2 | ⊚ | ⊚ | ⊚ | ⊚ |
| Ex. B | | | 5 | ⊚ | ⊚ | ⊚ | ⊚ |
| Ex. C | | | 10 | ⊚ | ⊚ | ⊚ | ⊚ |
| Com. 3 | | | 15 | ⊚ | ⊚ | ⊚ | X |
| Com. 4 | | 0.3 | 1 | □ | □ | ⊚ | ⊚ |
| Ex. D | | | 2 | ⊚ | ⊚ | ⊚ | ⊚ |
| Ex. E | | | 5 | ⊚ | ⊚ | ⊚ | ⊚ |
| Ex. F | | | 10 | ⊚ | ⊚ | ⊚ | ⊚ |
| Com. 5 | | | 15 | ⊚ | ⊚ | ⊚ | Δ |
| Com. 6 | | 1.5 | 1 | □ | 0 | ⊚ | ⊚ |
| Ex. G | | | 2 | ⊚ | ⊚ | ⊚ | ⊚ |
| Ex. H | | | 10 | ⊚ | ⊚ | ⊚ | ⊚ |
| Com. 7 | | | 15 | ⊚ | ⊚ | ⊚ | X |
| Com. 8 | | 3 | 1 | □ | 0 | ⊚ | ⊚ |
| Ex. I | | | 2 | ⊚ | ⊚ | ⊚ | ⊚ |
| Ex. J | | | 10 | ⊚ | ⊚ | ⊚ | ⊚ |
| Com. 9 | | | 15 | ⊚ | ⊚ | ⊚ | Δ |
| Com. 10 | | 5 | 1 | □ | 0 | 0 | ⊚ |
| Com. 11 | | | 2 | ⊚ | ⊚ | □ | ⊚ |
| Com. 12 | | | 10 | ⊚ | ⊚ | Δ | ⊚ |
| Com. 13 | | | 15 | ⊚ | ⊚ | X | X |
| Com. 14 | Ethylene | 0.1 | 1 | □ | Δ | ⊚ | ⊚ |
| Com. 15 | | | 2 | 0 | □ | ⊚ | ⊚ |
| Com. 16 | | | 5 | ⊚ | □ | ⊚ | ⊚ |
| Com. 17 | | | 10 | ⊚ | 0 | ⊚ | ⊚ |
| Com. 18 | | | 15 | ⊚ | 0 | ⊚ | Δ |

TABLE 1-continued

| | | wax | | Quality measurement | | | |
|---|---|---|---|---|---|---|---|
| No. | Type | Particle size(μm) | Amount (phr) | Friction coefficient | Coating exfoliation | Solution stability | Adhesion |
| Com. 19 | | 0.3 | 1 | 0 | △ | ◎ | ◎ |
| Com. 20 | | | 2 | 0 | □ | ◎ | ◎ |
| Com. 21 | | | 5 | ◎ | □ | ◎ | ◎ |
| Com. 22 | | | 10 | ◎ | 0 | ◎ | ◎ |
| Com. 23 | | | 15 | ◎ | 0 | ◎ | △ |

As can be seen in table 1, the quality of surface-treated steel sheet of PTFE-based wax is more excellent than that of ethylene-based wax. Particularly, as can be seen from the coating exfoliation results, it is preferable to use a PTFE-based wax with particle size of 0.1–3.0 μm and the amount of 2–15 phr in order to manufacture steel sheet for fuel tank with improved press processibility.

What is claimed is:

1. A waterborne resin solution for preparing a resin-coated steel sheet for a fuel tank of an automobile comprising:

a phenoxy resin;

melamine resin;

colloidal silica;

polytetrafluoroethylene-based wax having a particle size of 0.1–0.3 μm; and at least one plate-type metallic powder selected from the group consisting of Al, Zn, Mn, Co, Ni, Sn and SnO;

wherein said phenoxy resin has a number average molecular weight of 25,000 to 50,000 and solution comprises the largest portion by weight of all of the other components individually.

2. The resin solution of claim 1, wherein said phenoxy resin is a water soluble phenoxy resin;

said melamine resin is added in the amount of 2 to 15 phr on the basis of said phenoxy resin;

said colloidal silica is added in the amount of 10 to 20 phr on the basis of said phenoxy resin;

said polytetrafluoroethylene-based wax is added in the amount of 2 to 10 phr on the basis of said phenoxy resin; and said metallic powder is added in the amount of 5 to 70 phr on the basis of said phenoxy resin.

3. The resin solution of claim 1, wherein said metallic powder has length along its longest axis of 0.05–5 μm and an average thickness of 0.1–0.5 μm.

4. A method of fabricating resin-coated steel for a fuel tank of an automobile comprising the steps of:

coating a waterborne resin solution comprising a of phenoxy resin having a number average molecular weight of 25,000 to 50,000; 2 to 15 phr of melamine resin on the basis of said phenoxy resin; 10 to 20 phr of colloidal silica on the basis of said first solution; 2 to 10 phr of PTFE-based wax having a particle size of 0.1–0.3 μm on the basis of said phenoxy resin; and 5 to 70 phr of at least one plate-type metallic powder selected from the group consisting of Al, Zn, Mn, Sn, and SnO, wherein said phenoxy resin is the largest portion of all of the other components individually; and baking drying said resin-coated steel sheet at 140–250° C.

5. The method of fabricating resin-coated steel sheet of claim 4, wherein thickness of said resin coating is 1–10 μm based on dried coating thickness.

6. The method of fabricating resin-coated steel sheet of claim 4, wherein the length of metallic powder of said resin solution along its longest axis is 0.5–5 μm and an average thickness of 0.1–0.5 μm.

7. A resin-coated steel sheet for a fuel tank of an automobile comprising a waterborne resin solution comprising a water-soluble phenoxy resin having a number average molecular weight of 25,000 to 50,000;

2 to 15 phr of melamine resin on the basis of said phenoxy resin;

10 to 20 phr of colloidal silica on the basis of said phenoxy resin;

2 to 10 phr of polytetrafluoroethylene-base wax having a particle size of 0.1–0.2 μm on the basis of said phenoxy resin; and 5 to 70 phr of at least one metallic powder selected from the group consisting of Al, Zn, Mn, Co, Ni, Sn, and SnO on the basis of said phenoxy resin and with a particle size of 0.5–5 μm along the longest axis and an average thickness of 0.1–0.5 μg, said resin solution coated in the thickness of 1–10 μm based on dried coating thickness, wherein said phenoxy resin is the largest portion of all of the other components individually.

* * * * *